United States Patent
Porth et al.

[15] 3,642,316
[45] Feb. 15, 1972

[54] PIVOTED CAB WITH LOST-MOTION TILTING MECHANISM

[72] Inventors: Dieter Porth; Hans Rinnergschwentner, both of Rotenfels, Germany

[73] Assignee: Daimler-Benz Aktiengesellschaft

[22] Filed: Mar. 3, 1970

[21] Appl. No.: 16,056

[30] Foreign Application Priority Data

Mar. 5, 1969 Germany.....................P 19 11 118.3

[52] U.S. Cl. .............................................296/28 C, 180/89
[51] Int. Cl.......................................................B62d 33/06
[58] Field of Search ................180/89, 77 TC, 54; 296/28.21

[56] References Cited

UNITED STATES PATENTS

| | | | |
|---|---|---|---|
| 2,306,348 | 12/1942 | Spear | 180/89 |
| 2,699,223 | 1/1955 | Brumbaugh | 180/89 |
| 2,951,548 | 9/1960 | Crockett et al. | 180/89 |
| 3,312,303 | 4/1967 | Milloy | 296/28.21 X |

FOREIGN PATENTS OR APPLICATIONS

| | | | |
|---|---|---|---|
| 346,464 | 4/1931 | Great Britain | 180/89 |

*Primary Examiner*—A. Harry Levy
*Attorney*—Craig, Antonelli & Hill

[57] ABSTRACT

An installation for tilting the driver cab of a commercial-type motor vehicle in which the force necessary to tilt the cab is so transmitted to the driver cab by way of a pivotally connected lever that the force is introduced into the driver cab to the rear of its center of gravity.

9 Claims, 3 Drawing Figures

PATENTED FEB 15 1972  3,642,316

INVENTORS
DIETER PORTH
HANS RINNERGSCHWENTNER

BY Craig, Antonelli,
Stewart & Hill

ATTORNEYS

PIVOTED CAB WITH LOST-MOTION TILTING MECHANISM

The present invention relates to an installation for the tilting of the driver cab of a commercial-type motor vehicle.

It is necessary with the heretofore known, tiltable driver cabs of commercial-type motor vehicles to construct the floor of the driver cab very sturdily and rigidly in order that the force introduced during the tilting does not lead to nonpermissive stresses and permanent deformations of the driver cab floor. The hydraulic elements generally used for the tilting have, in fact, their point of engagement in front of the center of gravity of the driver cab in order to avoid an excessive structural length of these hydraulic elements.

Accordingly, the present invention is concerned with the aim to reduce the force necessary for the tilting in that its point of engagement is displaced to the rear of the center of gravity of the driver cab while simultaneously avoiding an excessively large path of the structural parts effecting the tilting, such as, for example, of a hydraulic element.

Consequently, an installation for the tilting of the driver cab of commercial-type motor vehicles is proposed in which, according to the present invention, the force necessary for the tilting is so transmitted to the driver cab by way of a swinging or rocking lever, pivotally connected at the vehicle frame or chassis that the force introduction into the driver cab takes place to the rear of the center of gravity thereof. The advantage is additionally achieved by such a displacement of the point of engagement of the force effecting the tilting, that during the beginning of the tilting operation, the forward spring support of the driver cab is not loaded or acted upon in the sense of a removal of the load, i.e., in the sense of an unloading.

According to a preferred type of construction of the present invention, the force introduction into the driver cab takes place only after a predetermined lost-motion path or free play of the swinging lever which is preferably so dimensioned that during the drive, the spring system of the driver cab is not impaired and no force transmission takes place from the driver cab by way of the rocker or swinging lever to a hydraulic element serving for the production of the tilting force.

Accordingly, it is an object of the present invention to provide an installation for the tilting of driver cabs in commercial-type motor vehicles which avoids by simple means the aforementioned shortcomings and drawbacks encountered heretofore in the prior art.

Another object of the present invention resides in an installation for the tilting of the driver cab of commercial-type motor vehicles which obviates the necessity for a particularly sturdy construction of the driver cab floor while avoiding at the same time excessive stresses and/or permanent deformations thereof.

A further object of the present invention resides in an installation for the tilting of the driver cab of commercial-type motor vehicles which permits a reduction of the force necessary to achieve the tilting of the driver cab.

Another object of the present invention resides in an installation for tilting the driver cab of a commercial-type motor vehicle which safeguards the spring-system of the driver cab against improper operation while at the same time keeping the actuating mechanism for the tilting means relatively simple.

These and further objects, features and advantages of the present invention will become more obvious from the following description when taken in connection with the accompanying drawing which shows, for purposes of illustration only, one embodiment in accordance with the present invention, and wherein.

Figure 1:
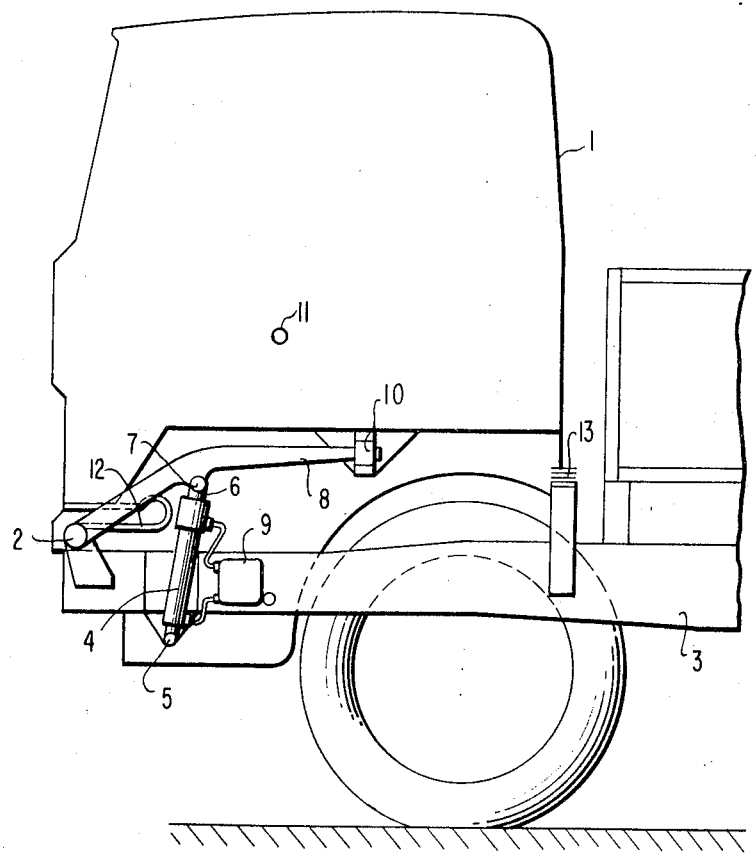
FIG. 1 is a somewhat schematic, side elevational view of a driver cab with a tilting installation in the normal position thereof in accordance with the present invention.
Figure 3:
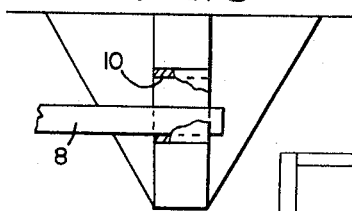
FIG. 3 is a somewhat schematic, partially cutaway view, showing the lost-motion connection between the lever and driver cab.
Figure 2:
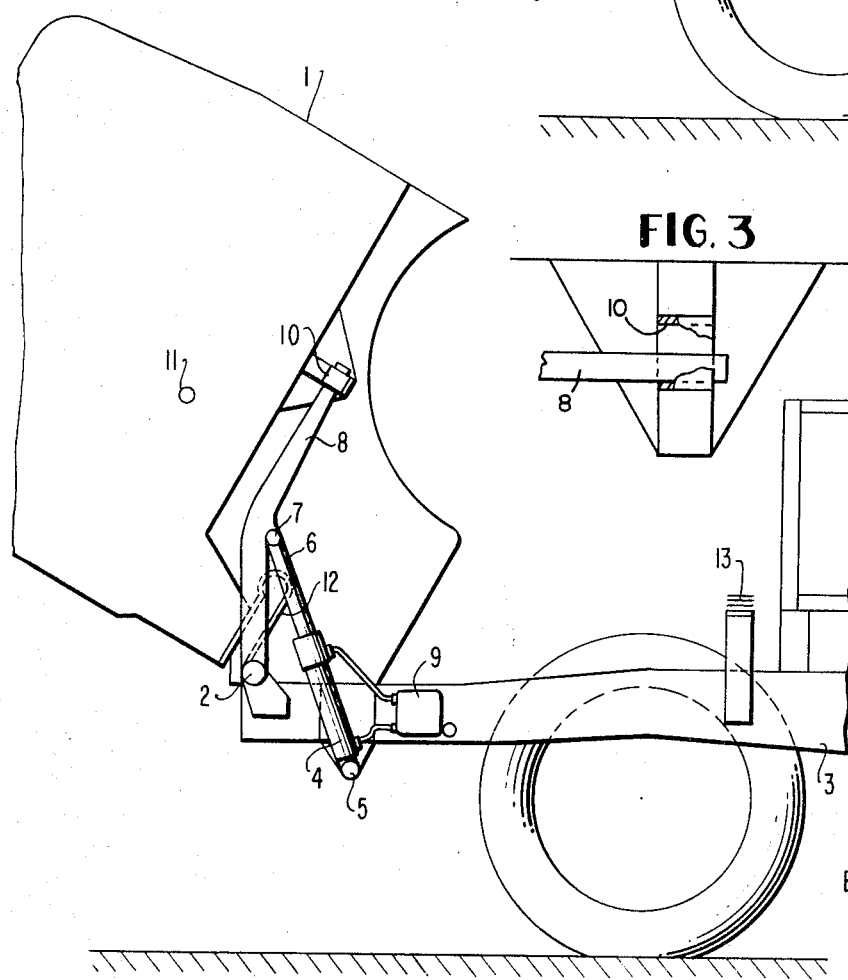
FIG. 2 is a somewhat schematic, side elevational view, similar to FIG. 1, illustrating the driver cab in the tilted position.

Referring now to the drawing wherein like reference numerals are used throughout the two views to designate like parts, the driver cab 1 schematically illustrated in these figures, of a commercial-type motor vehicle, only partly shown, is tiltable about the axis of a shaft 2 with respect to the vehicle chassis or frame 3. The driver cab 1 is tilted forwardly upon actuation of a pump 9 by means of a hydraulic element 4 which is pivotally connected at the vehicle frame 3 at 5 and whose piston 6 is pivotally connected at a swinging or rocking lever 8 at the point 7; the pivot lever 8, in its turn, is rotatably secured at the vehicle chassis or frame 3 in any conventional manner. The pivot lever 8 is thereby so constructed that its point of engagement 10 is located to the rear of the center of gravity 11 of the driver cab 1. The force introduction into the driver cab 1 commences only after a predetermined lost-motion path of the rocking lever 8 in order not to impair the spring means 12 and 13 of the driver cab 1 during the drive. See FIG. 3 for a showing of the lost motion slot arrangement for connecting the lever 8 to the point of engagement with the driver cab 10.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

1. An installation for tilting the driver cab of a motor vehicle comprising actuating means, lever means for transmitting the force necessary for tilting the cab from the actuating means to the cab, said lever means being pivotally connected at a relatively fixed part of the vehicle in such a manner that the force introduction into the driver cab takes place to the rear of the center of gravity thereof, and further means for assuring the force introduction into the driver cab only after a predetermined lost-motion path of the lever means.

2. An installation according to claim 1, characterized in that said further means includes a lost-motion guide slot mounted on the driver cab for guiding the lever means into engagement with said driver cab.

3. An installation according to claim 1, characterized in that the driver cab is spring supported by spring means, and in that the lost-motion path of the lever means provided by said further means is so dimensioned prior to the commencement of the tilting that during the drive the spring means are not impaired and no force transmission takes place from the driver cab by way of the lever means to the actuating means.

4. An installation according to claim 3, characterized in that said actuating means serving to produce the tilting force is a hydraulic element.

5. An installation according to claim 4, characterized in that the lever means is a swinging lever, and in that the relatively fixed part is a vehicle frame part.

6. An installation according to claim 5, characterized in that the driver cab forms part of a commercial-type motor vehicle.

7. An installation for tilting the driver cab of a motor vehicle comprising actuating means, lever means for transmitting the force necessary for tilting the cab from the actuating means to the cab, said lever means being pivotally connected at a relatively fixed part of the vehicle, and lost-motion connection means for assuring the force introduction into the driver cab only after a predetermined lost-motion of the lever means.

8. An installation according to claim 7, characterized in that the driver cab is spring supported by spring means, and in that the lost-motion path of the lever means provided by said connection means is so dimensioned that prior to the commencement of the tilting that during the drive the spring means are not impaired and no force transmission takes place from the driver cab by way of the lever means to the actuating means.

9. An installation according to claim 8, characterized in that said actuating means serving to produce the tilting force is a hydraulic element.

* * * * *